April 21, 1953     T. J. SAMBORSKI     2,635,345
GAUGING OR TRUEING INSTRUMENT
Filed Jan. 6, 1949
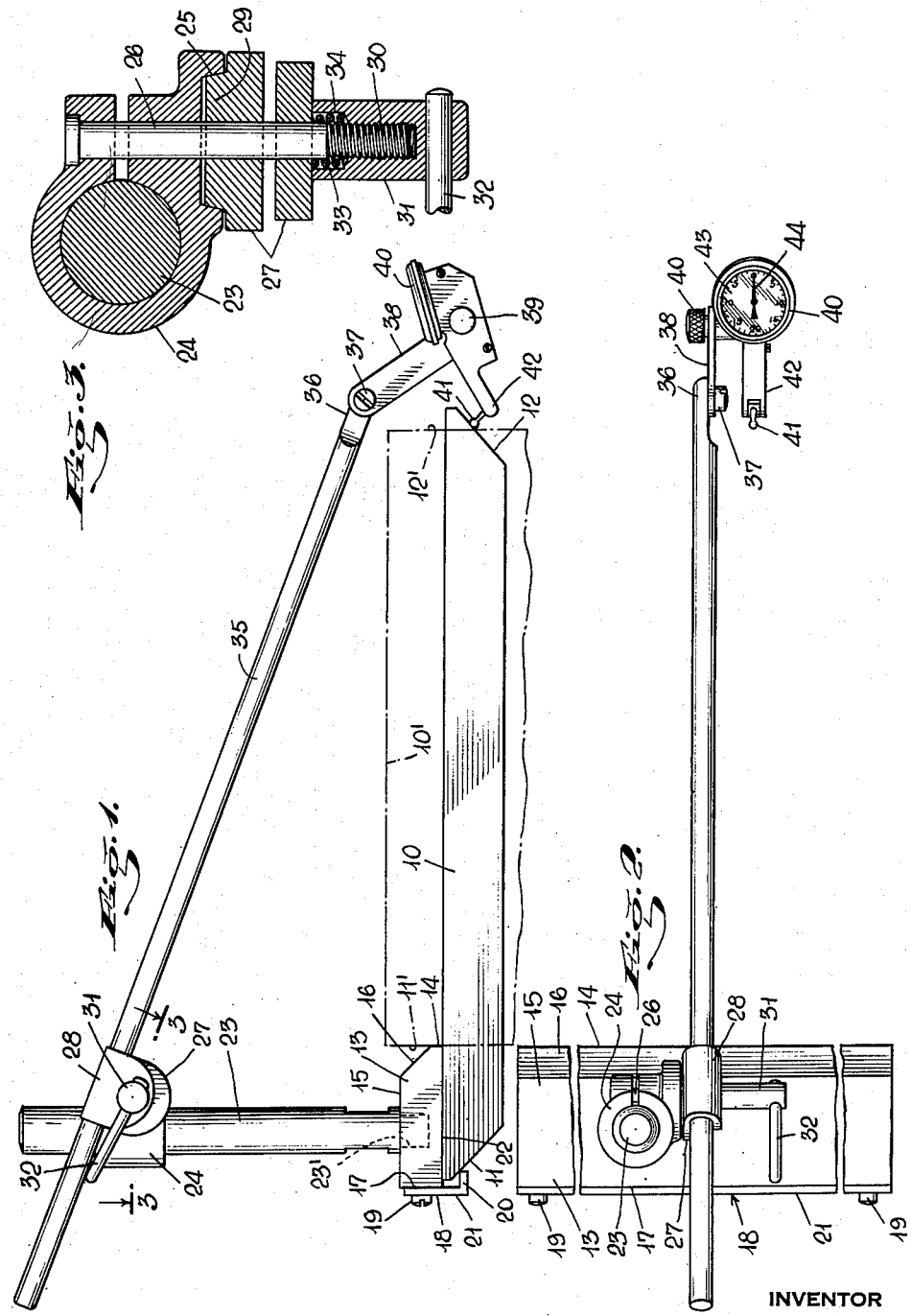
INVENTOR
THADDEUS J. SAMBORSKI
BY
*Howard E. Thompson*
ATTORNEY

Patented Apr. 21, 1953

2,635,345

UNITED STATES PATENT OFFICE 2,635,345

GAUGING OR TRUEING INSTRUMENT

Thaddeus J. Samborski, Brooklyn, N. Y.

Application January 6, 1949, Serial No. 69,419

1 Claim. (Cl. 33—172)

This invention relates to instruments or devices for use in the operation of trueing parallel surfaces, such for example, as the runways of lathes, milling machines, shapers, marvel power saws and other machines of this type and kind, in the operation of scraping or otherwise finishing such surfaces to render the same parallel. More particularly, the invention deals with an instrument or device of the character described having a block or bar portion with means for adjustably supporting a long arm thereon, with means adjustable at the free end portion of the arm for supporting an indicator device or the finger-feeler thereof with respect to a surface to be measured or gauged. Still more particularly, the invention deals with an instrument, the block or bar portion of which includes an adjustable angle-iron gauge plate for abutting surfaces or undercut bevelled surfaces in the use of the instrument.

The novel features of the invention will be best understood from the following descriptions when taken together with the accompanying drawing, in which certain embodiments of the invention are disclosed, and in which the separate parts are designated by suitable reference characters in each of the views, and in which:

Fig. 1 is a side view of an instrument or device made according to my invention, indicating one method of its use upon a workpiece having two undercut bevelled surfaces, and also indicating in dot and dash lines, a workpiece having two perpendicularly parallel surfaces.

Fig. 2 is a plan view of the structure as seen in Fig. 1, detached from the workpiece, with parts of the construction broken away; and Fig. 3 is a section on the broken line 3—3 of Fig. 1, on an enlarged scale.

In the operation of what is known as "trueing runways" or "trueing in two spaced surfaces to render the same truely parallel," difficulty has been experienced in accurately accomplishing this trueing operation, or rather in measuring or gauging the surfaces from time to time, during the scraping or finishing operations applied to the surfaces.

The object of my invention is to provide an instrument or device which can quickly and easily be adjusted to a suitable workpiece and then moved along the workpiece in gauging or measuring the accuracy of the trueing operations being performed thereon.

In Fig. 1 of the drawing, I have indicated at 10, an end view of an elongated rail or runway of any type or kind of machine or apparatus, and this rail or runway may be regarded as a workpiece, from the standpoint of description. This rail is undercut and has bevelled guide surfaces 11 and 12 defining side edges of the rail or runway. I have also indicated in dot and dash lines, in Fig. 1, a rail or runway 10' having perpendicularly straight side edges 11' and 12'.

My improved instrument or gauge device comprises an elongated block or bar 13 having a true and perfectly straight guide edge 14, which joins the upper surface 15 of the block at one side in a bevelled or similar surface 16. The other side 17 of the block is also perfectly true and paralleled to the side 14. Detachably mounted on the side 17 is a supplemented gauge element 18, in the form of an L-shaped or angle-iron strip attached to the side 17 by a number of screws 19. The horizontal leg 20 of the element 18 can be directed inwardly or outwardly with respect to the block, and in Fig. 1 of the drawing, the leg 20 is shown directed inwardly, so as to engage the undercut bevelled surface 11 of the workpiece 10. When mounted in the opposite direction, the surface 21 becomes a square surface arranged at ninety degrees to the lower surface 22 of the block. Secured to the block 13, and extending perpendicularly to the upper surface thereof, is a post 23. On this post is mounted a split sleeve 24, note Fig. 3, having a slightly bevelled socket 25 at one side thereof. The split ends of the sleeve are apertured to receive a bolt 26, which extends centrally through the socket 25. On the bolt 26 is arranged a split sleeve 27, the sleeve portion 28 of which can be seen in Figs. 1 and 2 of the drawing. The sleeve 27 has a tapered end 29 fitting in the socket 25. Adjustably mounted on the threaded end 30 of the bolt is a sleeve nut 31 having a radially extending fingerpiece rod 32 for rotating the same. Between the nut 31 and the sleeve 27 is disposed a spring 33, the latter seating in a recessed portion 34 of the nut, as clearly seen in Fig. 3. From the foregoing, it will appear that by tightening the nut 31, adjustment of the split sleeve 24 on the post 23 is controlled, as is also adjustment of the sleeve 27 on a long rod 35, arranged in the sleeve 27.

Adjustably mounted on the free end portion 36 of the rod 35, through the medium of a clamp screw 37, is a link 38. The link carries at its free end, a clamp bolt 39 having a knurled head 40' at one end, note Fig. 2 of the drawing. The bolt 39 adjustably supports an indicator device 40, of standard construction, and having a rounded end feeler-finger 41, which can be swung into several positions with respect to the end 42 of the device.

The indicator device has a dial-face, as seen at 43 in Fig. 2 of the drawing, comprising a pointer 44 movable over gauge markings reading from zero to twenty in two directions, so as to gauge plus or minus thousandths of an inch, in the use of the instrument. In this way, high and low uneven surfaces on workpieces can be indicated to the operator to gauge the scraping operations to be formed on the workpiece edges, in order to true the runway for accurate uses of the machine, of which the runway constitutes a part.

In the use of the tool, the various parts are adjusted, so as to bring either the edge 14, the leg 20 or surface 18 against one edge of the workpiece. The rod 35, link 38 and gauge device 40 are adjusted so as to bring the feeler-finger 41 upon the other surface of the workpiece and to set the needle 44 at zero, where the surfaces are regarded as true. The instrument is then moved longitudinally along the rail or runway or, in other words, workpiece, and as and when the needle or pointer 41 indicates an inaccuracy, the operator is informed as to just what must be done in trueing-up the runway or workpiece edges.

In Fig. 1 of the drawing, I have shown in full lines, the arrangement of the instrument upon the workpiece having the undercut bevelled edges 11 and 12 which are to be scraped for trueing. I have also indicated in dot and dash lines perpendicular edges 11' and 12' which are engaged by the surface 14 of the block and the feeler-finger 41. In this connection it will be understood that any type or kind of workpiece can be gauged or measured by my improved instrument, from the standpoint of trueing or paralleling any two associated surfaces. In some instances, the surfaces in question may vary as to contour. In other words, a square edge may be gauged with a bevelled or otherwise formed edge. It is also possible with my improved instrument to support and guide the block 13 along surfaces which are disposed angularly with respect to each other.

It will also appear that by utilizing the long rod 35, surfaces of wide spread workpieces or workpieces having wide spread edges to be gauged, as well as workpieces having closely arranged parallel surfaces, can be trued and gauged by my improved instrument. The post 23 has a reduced threaded end 23' for detachable mounting on the block 13 and the block may have other threaded sockets adjacent end portions thereof for disposing the post centrally of the block, as well as at end portions thereof, as is desirable in gauging certain types of workpieces, particularly in working or trueing ends of the runways or workpieces.

Fig. 2 of the drawing shows the end portions of the block 13 broken away, thus the other sockets are not indicated in the present drawing, but would be in the broken-away portions of the block, as will be apparent. From the foregoing it will be understood that the post 23 has an adjustable mounting or positioning on the block 13. Detachment of the post 23 with respect to the block also facilitates compact packaging of the complete instrument, when the same is not in use.

An instrument of the type and kind under consideration will save considerable time in the performance of the trueing operations hereinbefore mentioned and further, would enable the workman or scraper to produce in a shorter period of time, more accurate trueing operations on workpieces of the kind under consideration.

It will be understood that the sleeve 24 is rotatably adjustable around the post 23 and the sleeve 27 is rotatably adjustable around the bolt 26. This provides for any positioning of the rod with respect to the block that may be desired. Of course, the sleeve 24 is movable vertically on the post and longitudinally through the sleeve 27, thus controlling the positioning of the feeler 41 with respect to the block 13, or the supplemental gauge element 18.

Having fully described my invention, what I claim as new and desire to secure by Letters Patent is:

An instrument for trueing runways in machines of the character described, said instrument comprising a block having a straight edge, an upstanding post on said block, a pair of split sleeves for adjustably clamping an elongated rod at different heights on the post and in different extended lengths with respect to said post, one sleeve engaging the post and the other sleeve engaging said rod, a single clamp bolt for securing both sleeves in clamping position, a gauge device, a link adjustably supported on the free end of said rod, means for adjustably mounting said gauge device on said link for movement with respect to the straight edge of said block, said block having a surface opposed to said straight edge and parallel thereto, a supplemental elongated gauge element detachably and adjustably supported on said surface, and said element being L-shaped in cross-sectional form.

THADDEUS J. SAMBORSKI.

References Cited in the file of this patent

UNITED STATES PATENTS

| Number | Name | Date |
|---|---|---|
| 1,375,888 | Baer | Apr. 26, 1921 |
| 2,073,089 | Autenreith | Mar. 9, 1937 |
| 2,124,006 | Parker | July 19, 1938 |
| 2,287,890 | Legassey | June 30, 1942 |
| 2,352,535 | Guillet | June 27, 1944 |
| 2,456,003 | Knutson | Dec. 14, 1948 |

FOREIGN PATENTS

| Number | Country | Date |
|---|---|---|
| 17,041 | Great Britain | of 1914 |